(12) United States Patent
Cahill et al.

(10) Patent No.: US 6,941,943 B1
(45) Date of Patent: Sep. 13, 2005

(54) MACHINE FOR HEATING CATERED FOOD ITEMS UTILIZING A BUTANE GAS HEAT SOURCE WITH BURNER CONTROL MECHANISM ("TEMPERATURE CONTROLLED BUTANE CHAFING DISH")

(76) Inventors: John Edward Cahill, 5804 Woodside Ave., Myrtle Beach, SC (US) 29577;
Theodore Hammerman, 704 Dogwood Ave., Myrtle Beach, SC (US) 29577

( * ) Notice: Subject to any disclaimer, the term of this patent is extended or adjusted under 35 U.S.C. 154(b) by 0 days.

(21) Appl. No.: 10/364,830

(22) Filed: Feb. 11, 2003

(51) Int. Cl.[7] ............................................. F24C 3/08
(52) U.S. Cl. ........................................ 126/40; 126/42
(58) Field of Search ............................ 126/40, 39 B, 126/42; 431/258

(56) References Cited

U.S. PATENT DOCUMENTS

| | | | |
|---|---|---|---|
| 4,122,764 A | * | 10/1978 | D'Ambra ...................... 99/483 |
| 4,759,276 A | * | 7/1988 | Segroves ...................... 99/339 |
| 4,899,722 A | * | 2/1990 | Horewitch ................. 126/39 H |
| 5,211,157 A | * | 5/1993 | Schwartz et al. .......... 126/39 E |
| 2003/0192525 A1 | * | 10/2003 | Ruiseco ........................ 126/33 |

* cited by examiner

Primary Examiner—Alfred Basichas
(74) Attorney, Agent, or Firm—Dorothy S. Morse

(57) ABSTRACT

A chafing dish for rapidly bringing catered food items up to the temperatures required for safe food handling and optimal flavor enhancement, and even heating of the food items thereafter without a constant monitoring of the flame height. The invention utilizes butane gas as a heat source and a burner control mechanism with a butane burner integrated into the base of a chafing dish, a bracket to hold a butane can securely in place, an engaging apparatus to start the flow of butane from the butane can to the burner, a copper tube to transport butane from the butane can to the burner, an electronic ignition switch and insulated wiring to ignite the butane at the burner, a burner control mechanism and regulator to regulate the flow of butane to the burner for the purpose of allowing a range of flame height and temperature, and a series of ventilation holes in the base of the chafing dish.

20 Claims, 6 Drawing Sheets

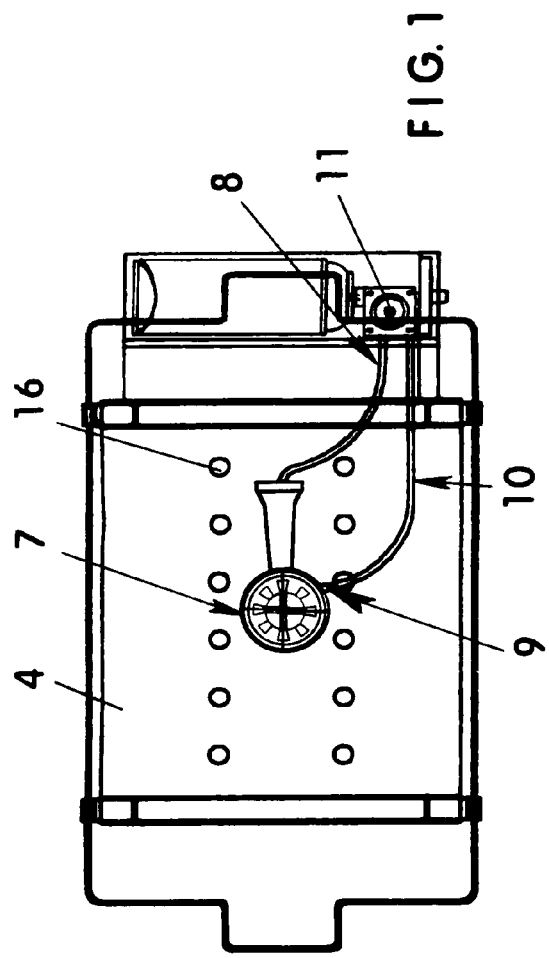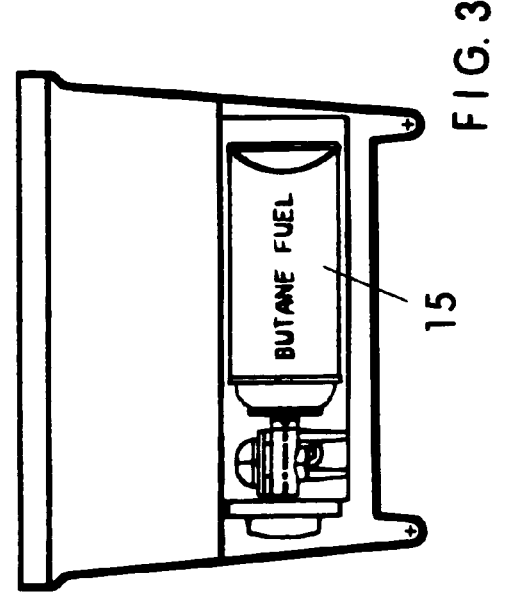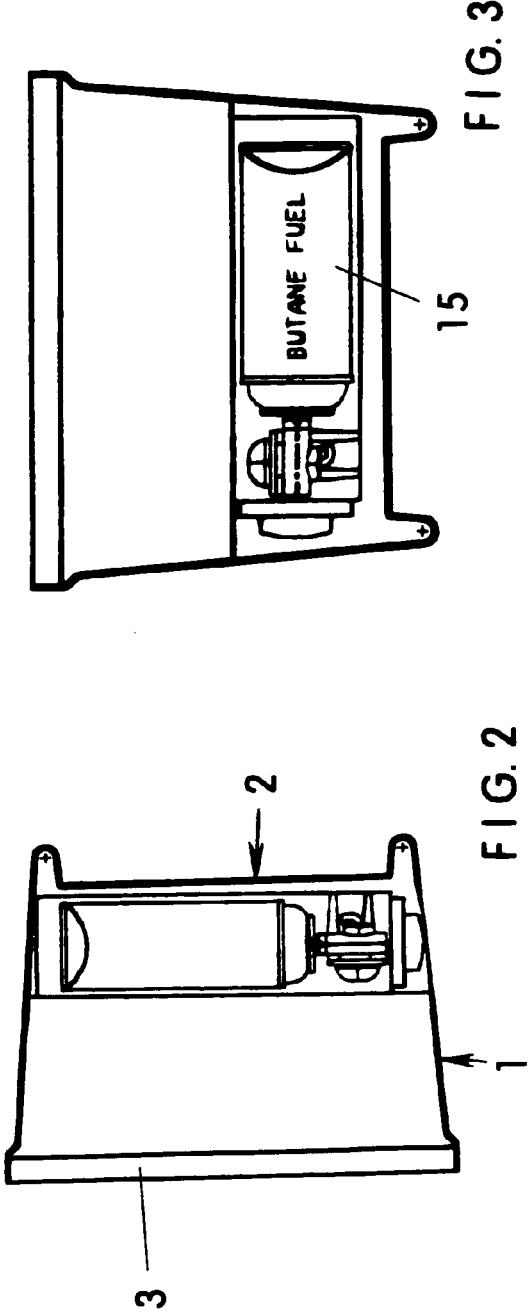
FIG. 1
FIG. 3
FIG. 2

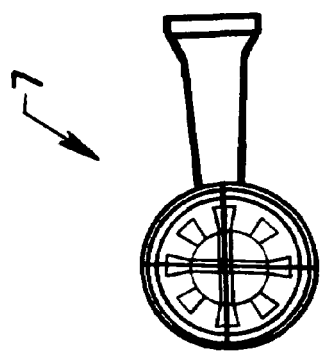
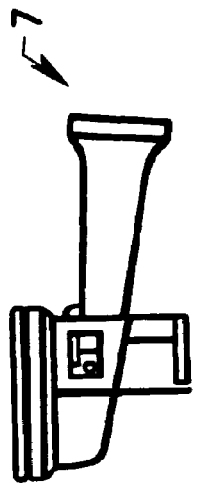
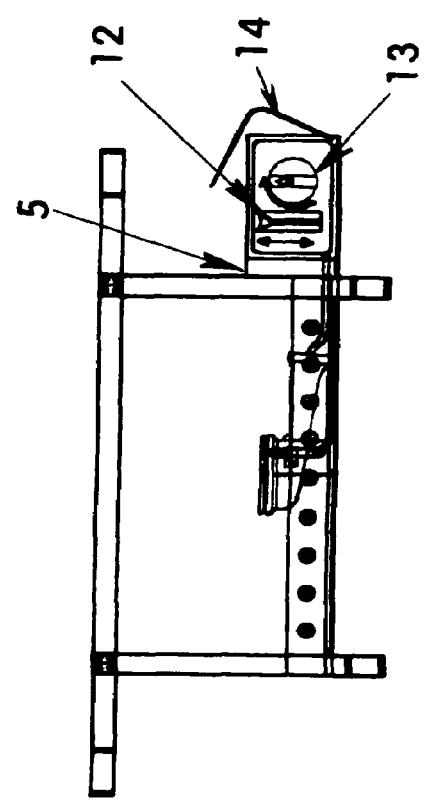
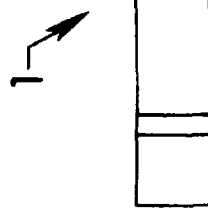

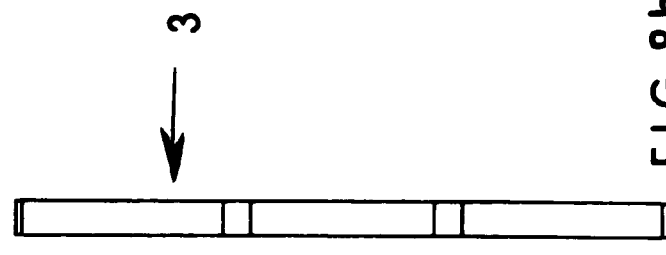
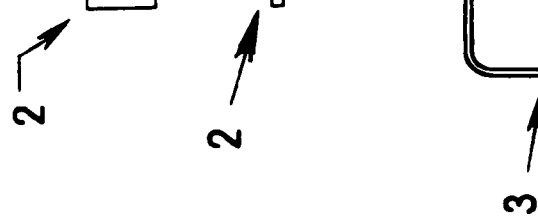
FIG. 7a
FIG. 7b
FIG. 8a
FIG. 8b

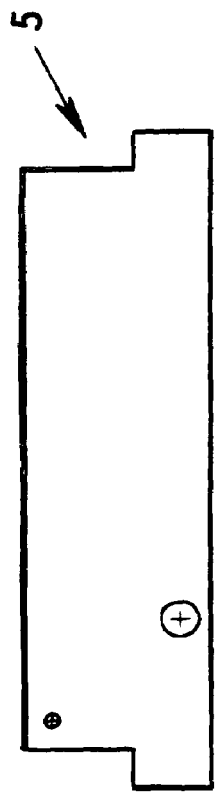
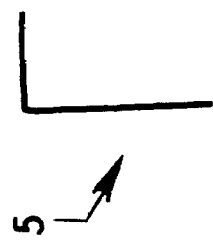
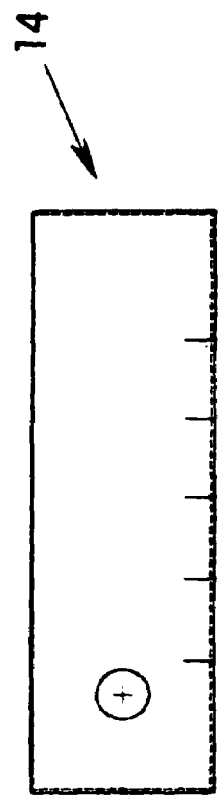
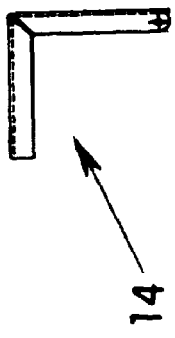
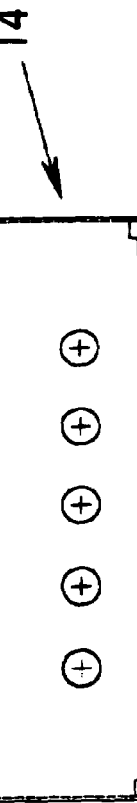

MACHINE FOR HEATING CATERED FOOD ITEMS UTILIZING A BUTANE GAS HEAT SOURCE WITH BURNER CONTROL MECHANISM ("TEMPERATURE CONTROLLED BUTANE CHAFING DISH")

CROSS-REFERENCES TO RELATED APPLICATIONS

None

BACKGROUND OF THE INVENTION

1. Field of the Invention

This invention relates generally to the field of food service, food preparation, and food preservation, and, more specifically to apparatus for heating catered food items utilizing a butane heat source and a burner control mechanism.

2. Description of the Related Art

While chafing dishes have been used in a variety of settings and for heating a wide variety of food items, there are limitations in existing chafing dish technology, including such things as the inability to maintain sufficient heat to insure food safety, the inability to heat food in the chafing dish uniformly, the inability to heat food reliably outdoors' under breezy conditions (when using sterno) or due to the absence of electricity (when using heating rods), and the inability to heat water in the water pan quickly.

Portable gas stoves have been used for such things as camp cooking. The present invention chafing dish was designed to utilize the benefits of such stoves, that is, a powerful, non-electric heat source that could be regulated effectively to 1) increase efficiency. 2) increase food safety, 3) promote uniformity of temperature to enhance flavor, and 4) increase suitability for outdoor use. Thus, butane gas burners were selected as the heat source for an improved chafing dish technology. The design of the present invention chafing dish incorporates a butane gas burner into the base of a chafing dish. The burner utilizes gas from small, commercially available cans of butane gas. After a safety device has been engaged, the valve of the gas can is opened with an initiating pin and gas in the gas can is then led through a regulator and into the integrated burner via a copper tube. The present invention chafing dish has a device that regulates the rate of flow of the gas, thereby allowing improved temperature control. The present invention also utilizes an electronic ignition to ignite the gas at the burner for easy use.

Chafing dishes have been used to heat food for many years. Chafing dishes utilize a portable heat source to heat water in a pan or tray (hereafter referred to as the "water pan" or "water tray";): the heated water in the water pan in turn heats food in a second, separate pan or tray (hereafter referred to as the "food pan" or "food tray") placed into the water pan. The chafing dish is used in locations such as buffet tables, where no fixed heating or cooking source (like a stove or range) is available.

Prior chafing dish technology employed one of three heat sources to heat the water ir the water pan: 1) sterno cans placed below the water pan. 2) electric heating rods placed in the water pan, or 3) a wick-type fuel called a "heat source" that functioned essentially like sterno.

Earlier chafing dish technology using sterno cans placed under the water pan is deficient for a number of reasons. First, the heat generated by burning sterno cans is not reliably consistent. Flood temperature throughout the food pan may rise and fall due to this inconsistency. Also, temperatures in different areas of the food pan may vary. These conditions can cause at least two significant problems: a) potential food safety problems if foods are not kept at minimum temperatures required to prevent microbial contamination, and b) adverse consequences to the flavor of the foods being heated in the chafing dish as food gets too hot or too cold. The inventors' design utilizes a heat source that greatly increases the consistency of heat delivered to the food tray and uniformity of heat distribution throughout the area of the food tray, thereby diminishing the risk of these problems.

Second, the heat generated by burning Sterno cans is not efficient. Chafing dishes utilizing sterno cans requires considerable more time to heat the water in the water pan than does the present invention chafing dish described herein. The present invention chafing dish heats the water in the water pan to one hundred forty degrees Fahrenheit, the temperature required by food safety regulations in the inventors' home state, in approximately four minutes, whereas existing technology utilizing sterno or electric rods require between twenty-five and forty minutes to reach this temperature. Moreover, because the heat source is more reliable, the invention enhances efficiency for the user by eliminating the need for frequent visual inspections to determine whether the heat source is functioning. In addition, sterno cans; are inefficient because the temperature cannot easily be changed or regulated, with the method for changing temperature using sterno being to partially cover/uncover the can manually with a lid thereby allowing less or more heat to be released. This is both difficult, and potentially dangerous. The present invention design allows for easy and safe temperature change and regulation by means of an easily accessible control mechanism built into the front of the chafing dish. Finally, the present invention increases efficiency and diminishes environmental contaminants because unused butane can be stored and utilized at a later date, whereas unused sterno must be discarded because it cannot be transported or stored safely once opened. Third, the heat generated by burning sterno cans is not reliable outdoors, where many events requiring catered food items take place. The flame generated by the sterno can be easily extinguished by moderate breezes, and, even when not fully extinguished, sterno flames waiver greatly in such breezes. The present invention has been outdoors and performs significantly better in windy conditions than prior art chafing dishes using sterno.

Chafing dishes that use an electric rod to heat the water in the water pan suffer from some of the same deficiencies noted or sterno use, such as slow heating time, uneven heat, and limited usefulness in area (both indoors and outdoors) where there is no convenient or safe electric socket. As noted above, the present invention incorporates means to minimize or eliminate these shortcomings.

Two portable butane burners are known that can be used with prior art chafing dishes to replace the sterno, wick-type heat sources, and electric rods. However, neither has all of the advantages of the present invention. One such invention is the butane burner assembly disclosed in U.S. Pat. No. 4,899,722 to Horewitch (1990). It discloses a butane housing similar to that of the present invention, with a burner secured within the top surface of a cantilevered arm extending perpendicularly thereto from the side remote from its pivoting door. Thus, the Horewitch burner can be placed under one end of a water pan supported by its upper frame. With the butane can housing positioned in part beneath the water pan. The Horewitch housing also has adjustable legs, that are used to adjust the distance between its burner and the bottom of the water pan. Set up for a series of Horewitch inventions in a catered food line would take considerable more time than that required for the present invention chafing dish unit of the present invention. Thus, instead of having to position a prior art chafing dish, adjust the eight feet on two Horewitch burners, and then position the cantilevered arms of each Horewitch burner under a different end of the water pan in a prior art chafing dish, present invention set up only requires positioning on a serving surface. The present invention also has a space-solving advantage over the Horewitch invention, and will allow the closer spacing of elevated chafing dish water pans where needed. The second such invention is the butane burner assembly disclosed in U.S. Pat. No. 5,211,157 to Schwartz (1993), which discloses a butane housing similar to that of the present invention. However, the Schwartz burner has a handle and an annular flange that are used for positioning it under a surface needing to be warmed. When used with a chafing dish having openings below the water pan for sterno or wick-type heat sources, the Schwartz flange allows its burner to be set secured within such an opening. Since a piezo-electric ignition line and a fuel supply line are connected between the Schwartz burner and its butane can housing, as shown in FIG. 1, it has removable connections at the butane can housing so that the ignition and fuel lines attached through the bottom portion of the Schwartz burner can be temporarily detached for extension through the chafing dish opening prior to setting the Schwartz burner in place. Thus, the present invention also has a time-saving advantage over the Schwartz invention, and instead of having to position a prior art chafing dish, disconnect the ignition and fuel lines attached to the Schwartz burner from the butane can housing, extend the lines through a sterno or wick-type heat source opening in the bottom of the chafing, dish, using the handle attached to the Schwartz burner position the Schwartz burner within the selected sterno or wick-type heat source opening, and then reconnect the ignition and fuel lines to the butane can housing, present invention set up only requires positioning on a serving surface. Additional time savings would also be realized by the present invention when food service is complete, as there would be removal and storage of only one item, and no dismantling time involved. With the Schwartz and Horewitch inventions a person must move two or more items when dismantling each such invention, with the Schwartz invention taking even longer to remove the ignition and fuel supply lines from the Sterno or wick-type heat source opening. Also, the integrated burner in the present invention is simpler in design and eliminates extra components needed in the Horewitch and Schwartz inventions, such as the cantilevered arm, quick disconnect lines, flange, and handle. Thus, the present invention also has cost advantages over the Horewitch and Schwartz inventions.

BRIEF SUMMARY OF THE INVENTION—OBJECTIVES AND ADVANTAGES

The primary object of the invention herein is to create a more efficient chafing dish that heats food more quickly and more safely. Another object of the invention is to create a chafing dish that significantly reduces the amount of time required to heat water to temperatures required by safe food handling regulations. Another object of the invention is to create a chafing dish that heats food to the proper temperature to enhance flavor. A further objective of the invention is to create a chafing dish that maintains the proper temperature to insure safe food handling. A further object of the invention is to create a chafing dish that diminishes the risk of microbial contamination of food. Yet still another object of the invention is to diminish cost by allowing for the re-use of unspent fuel that heats the water in the water tray. Another object of the invention is to diminish environmental contaminants generated by chafing dishes by eliminating the need to dispose unused fuel. Another object of the invention is to increase efficiency and diminish labor costs by diminishing the time required to heat water in the water tray. Another objective of the invention is to increase efficiency and diminish costs by creating a reliable heat source that does not need to be constantly monitored by workers. A further object of the invention is to create a chafing dish that can be used outdoors in windy conditions. Yet another object of the invention is to simplify the means of raising or lowering the temperature in the chafing dish. Yet another object of the invention is to increase worker safety by eliminating the need to handle hot and dangerous materials such as sterno cans and electric rods. Yet still another object of the invention is to increase safety by using a controlled, integrated heat source. Yet another further object of the invention is to eliminate the risk of fire and injury resulting from the use and handling of sterno cans.

Other objectives and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed herein a chafing dish for heating catered food items utilizing butane gas as a heat source and a burner control mechanism, comprising: a butane burner integrated into the base member of a chafing dish, a safety mechanism utilizing a bracket to hold a butane can securely in place, an engaging pin to start the flow of butane from the butane can to said burner, a copper tube to transport butane from the butane can to said burner, an electronic ignition switch and insulated wiring to ignite the butane at the burner, a burner control mechanism and regulator to regulate the flow of butane to the burner for the purpose of allowing a range of flame height and temperature, and a series of ventilation holes in the base or the chafing dish.

BRIEF DESCRIPTION OF THE SEVERAL VIEWS OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is an elevational view of the invention.

FIG. 2 is a cross-sectional view of the right side of the invention, tipped over to rest on its left side.

FIG. 3 is a cross-sectional view of the front of the invention.

FIG. 4 is a cross-sectional view of the right side of the invention, resting normally.

FIG. 5a is a top view of the butane burner of the invention.

FIG. 5b is a side view of the butane burner of the invention.

FIG. 6a is a front view of the leg of the invention.

FIG. 6b is a side view of the leg of the invention.

FIG. 7a is a front view of the leg support of the invention.

FIG. 7b is a side view of the leg support of the invention.

FIG. 8a is a partial top view of the upper frame of the invention.

FIG. 8b is an end view of the upper frame of the invention.

FIG. 10a is an end of the back and top portions of the butane can housing of the invention.

FIG. 10b is a front view of the back portion of the butane can housing of the invention.

FIG. 11a is an end view of the hinged fuel cover door of the invention.

FIG. 11b is a top view of the of the hinged fuel cover door of the invention.

FIG. 11c is a front view of the door and cover lid of the invention.

DETAILED DESCRIPTION OF THE INVENTION

Figure 9B:
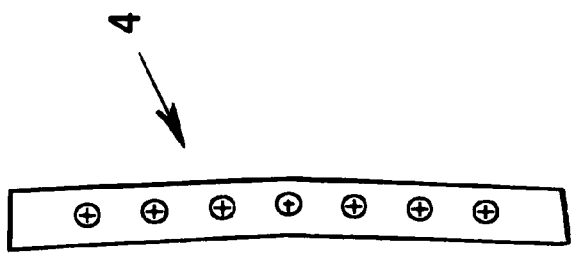
FIG. 9b is an end view of the base of the invention.

Detailed descriptions of the preferred embodiments are provided herein. It is to be understood, however, that the present invention may be embodied in various forms and still remain within the scope of the appended claims. Therefore, specific details disclosed herein are not to be interpreted as limiting, but rather as a basis for the claims, and as a representative basis for teaching one skilled in the art to employ the present invention in virtually any appropriately detailed system, structure, or manner.

Turning first to FIG. 1, one can see the basic design of the invention. A frame 3 is utilized to elevate a tray (not shown) containing water. In prior art chafing dishes, water is heated, either from below utilizing sterno or a wick-type "heat source", or by inserting an electric heating rod into the water tray. A food pan (not shown) is then placed into the frame above the water tray and the food therein is heated by the hot water in the water tray below it. The invention provides a novel and useful improvement to existing chafing dish technology by using butane gas as a heat source for faster heating of catered food to the temperatures required for safe food handling and more even food heating once safe temperatures are achieved for enhanced food flavor. The invention contains a safety mechanism 12, electronic ignition device 9, an integrated gas burner 7, a temperature control mechanism 13, a gas regulator 11, a gas transport system 8, and a ventilation system (holes 16 in FIGS. 1 and 3). The invention utilizes a number of new features for chafing dish technology. Turning first to FIG. 4, there is shown the innovation of utilizing butane gas as the heat source for the chafing dish. FIG. 1 illustrates the incorporation of the butane gas as a heat source for the chafer. In that same illustration there is shown 1) the incorporation of the butane gas regulator 11 (which functions as part of the safety mechanism and as part of the temperature control mechanism). 2) the electronic igniter 9 and igniting wire 10, 3) the integrated gas burner 7. 4) the gas tubing 8 which transports the butane from the can 15 (via the engaging pin (not shown) and regulator 11) to the burner 7, and 5) the series of ventilation holes 16 incorporated into the base 4 of the chafer. FIG. 3 shows 1) the hinged fuel cover door 14 and 2) the combination igniter switch and gas control mechanism 13.

The invention is a butane gas, burner controlled chafing dish. More specifically, a butane gas can 15 is inserted into the housing 5 of the chafer, with the notched end of the can pointed toward the engaging pin (not shown) and gas regulator 11, FIG. 3 shows a lever in this chamber acting as a safely mechanism 12. When engaged, the safety mechanism 12 pushes the butane can 15 against the gas regulator 1, which in turn pushes an engaging pin (not shown) that opens the valve in the butane can 15. No gas can escape from the can 15 unless the safety mechanism 12 is engaged. The hinged fuel cover door 14 is then closed to protect the butane can 15 from damage while in use.

As illustrated by FIG. 1, after the safety mechanism 12 has been engaged, butane from the can 15 flows through the regulator 11, then toward the integrated gas burner 7 via the copper tubing 8. When the combination igniter switch/gas control dial 13 shown in FIG. 3 is turned to the proper position, the butane at burner 7 is ignited by the electronic igniter 9 connected to the combination igniter switch/gas control dial 13 via an insulated ignition wire 10. The user of the invention controls flame height, and thus temperature, by means of the combination igniter switch/gas control dial 13. Proper ventilation for the burner 7 is provided by the ventilation holes 16 incorporated into the base member 4 of the chafer, as shown in the same illustration.

The present invention provides several advantages over existing chafing dish technology, including, but not limited to. 1) increased efficiency via reduced heating time, reduced set-up time, reduced time necessary to monitor the heat source, 2) increased food safety resulting from faster heating time and more uniform heat distribution. 3) enhanced food flavor resulting from ability to easily regulate temperature. 4) increased ease of use resulting from electronic ignition and temperature control mechanism. 5) greater versatility due to its ability to be used outdoors, and 6) increased safety and environmental benefits resulting from the elimination of the need to handle hot sterno cans or electric rods and the need to dispose of unused sterno.

While the invention has been described in connection with a preferred embodiment, it is not intended to limit the scope of the invention to the particular forms set forth, but on the contrary, it is intended to cover such alternatives, modification, and equivalents as may be included within the spirit and scope of the invention as defined by the appended claims.

Figure 9A:
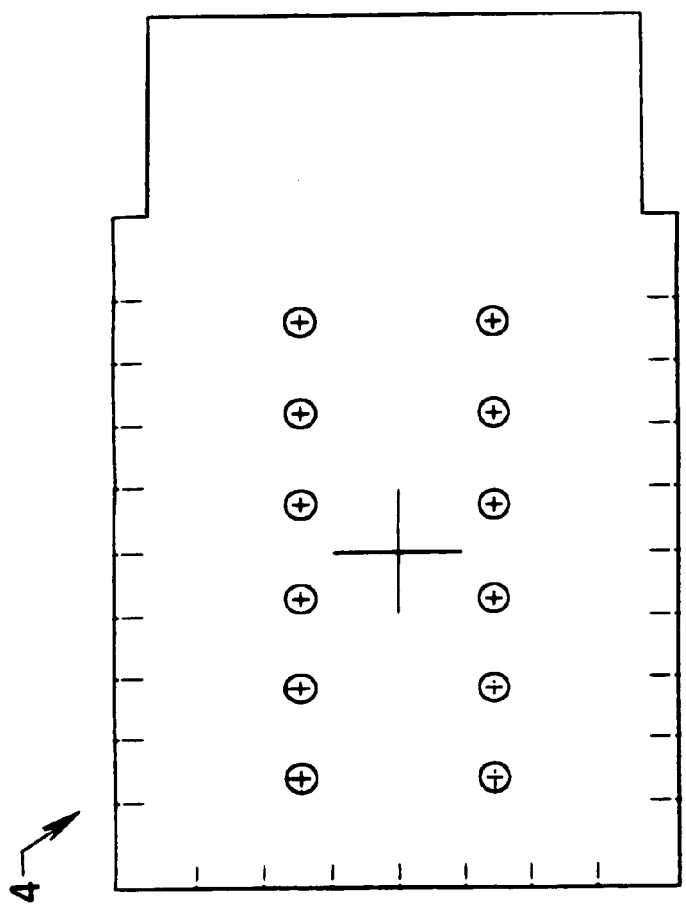
FIG. 9a is a top view of the base of the invention, with broken lines showing the position of ventilation holes.
Figure 9C:
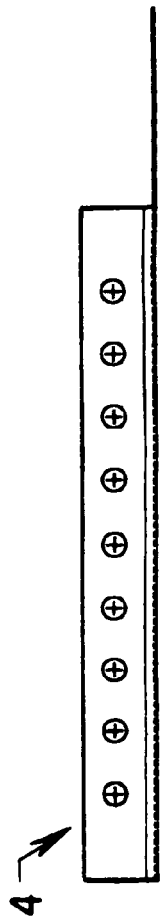
FIG. 9c is a side view of the base of the invention.
Figure 12A:
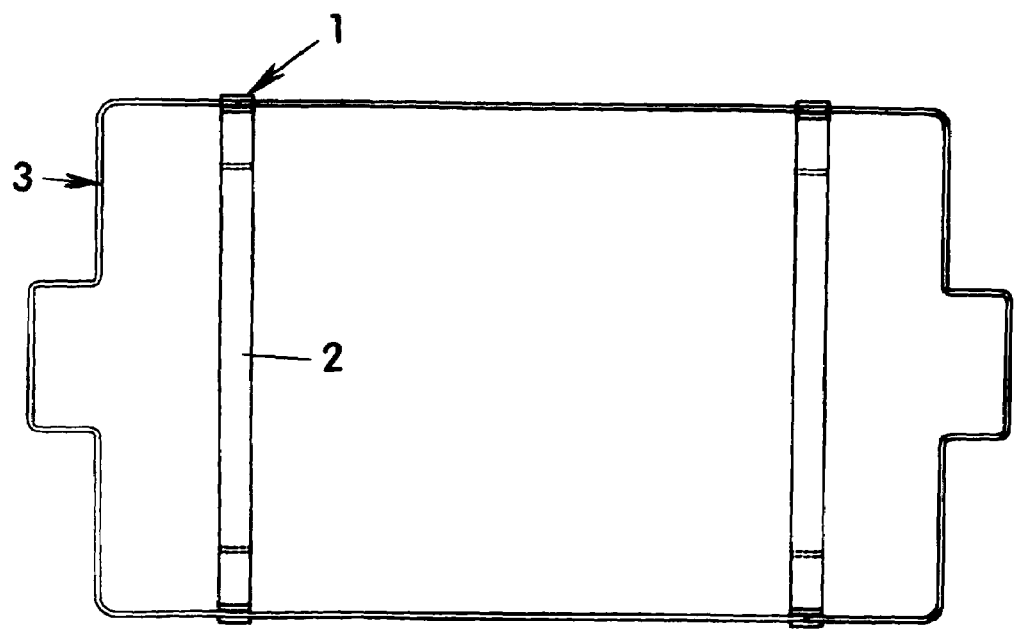
FIG. 12a is a top view of the assembled upper frame, legs, and leg supports of the invention.
Figure 12B:
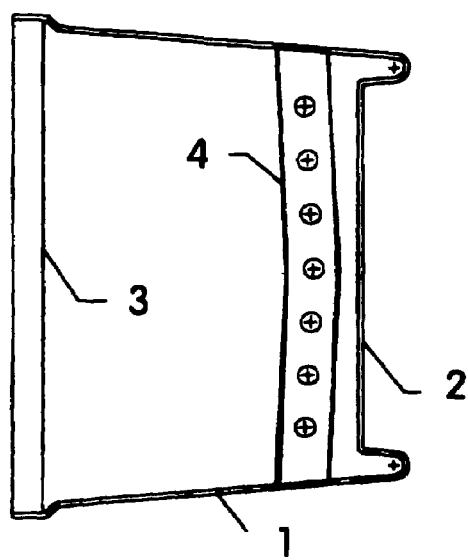
FIG. 12b is an end view of the frame assembly of the invention tipped upon one side.

Additionally. FIGS. 5a and 5b respectively show top and side views butane burner 7, while FIGS. 6a and 6b show one of the legs 1 used to support upper frame 3 above the butane burner 7. Also. FIGS. 7a and 7b show one of the leg supports 2 used to attach two legs 1 together. FIGS. 8a and 8b show the configuration of upper frame 3, with FIGS. 9a–9c show views of base member 4. Further. FIGS. 10a and 10b show the butane can housing 5, while FIGS. 11a–11c show the hinged fuel cover door 14 for housing 16. In addition, FIGS. 12a and 12b show the frame assembly of the invention having upper frame 3, leg supports 2, and legs 1, with FIG. 12 also showing base member 4.

What is claimed is:

1. A chafing dish for use with a water pan, food tray and removable food cover, and the heating of catered food items utilizing a butane gas can as a heat source and a burner control mechanism, said chafing dish apparatus comprising:

a frame assembly having a base, an upper frame, and opposing ends, with legs connected between said base and said upper frame, and leg supports connected to said legs;

a butane burner integrated into said base;

a housing to hold the butane can securely in place, said housing positioned exterior to said legs on one of said opposing ends;

a butane gas regulator;

a safety mechanism engaged by a lever in the front of said housing to push the butane gas can against said regulator;

an engaging pin pushed by said regulator to start the flow of butane from the butane can to said burner;

a copper tube configured and positioned to transport butane from the butane can to said burner;

an electronic ignition switch and insulated wiring to ignite the butane at said burner;

a burner control mechanism to regulate the flow of butane to said burner for the purpose of allowing a range of flame height and temperature; and a series of ventilation holes in said base of chafing dish whereby when a water pan is supported by said frame assembly, a food tray is in contact with the water pan and covered by the removable food cover, and when said lever is engaged to push the butane gas can against said regulator to allow butane fuel to flow to said burner, food placed in the food tray is brought up to the 140° temperature required for safe food handling in approximately four minutes, and said burner control means and fuel regulator provide even heating once the desired food temperature is reached for continued safe food handling of the catered food and optimal favor enhancement.

2. The chafing dish apparatus of claim 1 wherein said housing has a hinged fuel cover door connected to said housing.

3. The chafing dish apparatus of claim 1 wherein some of said ventilation holes in said base are positioned adjacent to said burner.

4. The chafing dish apparatus of claim 1 wherein said base comprises at least one upstanding member with ventilation holes therein.

5. The chafing dish apparatus of claim 1 wherein said housing has a hinged fuel cover door connected to said housing and wherein said base comprises at least one upstanding member with ventilation holes therein.

6. The chafing dish apparatus of claim 5 wherein some of said ventilation holes in said base are positioned adjacent to said burner.

7. The chafing dish apparatus of claim 1 wherein said hinged fuel cover door comprises ventilation holes.

8. A chafing dish for use with a water pan, food tray and removable food cover, and the heating of catered food items utilizing a butane gas can as a heat source, said chafing dish comprising:

a base having a raised perimeter, a plurality of ventilation holes, and opposing ends, a housing configured and sized for holding one butane can in a fixed position, said housing being positioned laterally to one of said opposing ends;

a butane burner centrally integrated into said base;

an upper frame;

a plurality of legs and leg supports connected between said base and said upper frame;

a copper tube configured and positioned for transporting butane fuel from a butane can to said burner;

an electronic igniter positioned adjacent to said butane burner;

a fuel regulator;

a combination gas control and igniter switch connected to said regulator to allow a range of flame heights and temperatures for said burner;

an insulated igniter wire connected between said electronic igniter and said regulator;

an engaging pin pushed by said regulator to start the flow of butane from the butane can and through said copper tube to said burner; and a safety lever associated with said housing that is movable between engaged and non-engaged positions, and wherein when said lever is in said engaged position a butane can positioned in said housing is pushed against said pin to initiate butane flow through said regulator, and, when said lever is in said non-engaged position, butane fuel is not permitted to flow from the butane can.

9. The chafing dish apparatus of claim 8 wherein said housing has a hinged fuel cover door.

10. The chafing dish apparatus of claim 9 wherein said hinged fuel cover door comprises ventilation holes.

11. The chafing dish apparatus of claim 10 wherein said raised perimeter has ventilation holes.

12. The chafing dish apparatus of claim 8 wherein some of said ventilation holes are positioned adjacent to said burner.

13. The chafing dish apparatus of claim 8 wherein said raised perimeter has ventilation holes.

14. A method for bringing up the temperature of catered food in approximately four minutes to the 140° temperature required for safe food handling and optimal flavor enhancement, and also even heating of the catered food for continued safe food handling and optimal flavor enhancement without constant monitoring of flame height once the desired food temperature is reached, said method comprising the steps of:

providing an upper frame, a base member having a bottom surface with a plurality of holes and a raised perimeter, an elevated structure upwardly depending from said base member, a butane can housing, butane can holding means, a butane burner centrally integrated into said bottom surface, a fuel regulator, copper tubing connected between said burner and said regulator, pin means positioned between said regulator and said can holding means, a safety lever movable between engaged and non-engaged positions, regulator control means movable between a position of minimum fuel flow and a position of maximum fuel flow, electronic igniter means, and a quantity of heat insulated wiring connected between said regulator control means and said electronic igniter means, and;

also providing a water pan with an outwardly depending upper flange having an upwardly depending rim, it least one food tray, lid means having a perimeter smaller than that of said upwardly depending rim, and a butane can;

positioning said water pan upon said elevated structure;

positioning said at least one food tray upon said water pan;

positioning said lid means on said upper flange within said rim;

using said butane can holding means to securely position said butane can within said butane can housing;

setting said regulator control means at said position of maximum fuel flow;

moving said lever to said engaged position whereby said regulator moves against said pin means, said pins means opens the valve on said butane can to release butane fuel into said regulator, the fuel travels from said regulator into said copper tubing and then into said burner where said electronic igniter means initiates fuel combustion; and adjusting said regulator control means between said position of maximum fuel flow and said position of minimum maximum fuel flow for uninterrupted.

15. The method of claim 14 wherein the step of securing said butane can within said housing can precede said steps of positioning said water pan, said food tray, and said lid means.

16. The method of claim 14 wherein said housing has a hinged fuel cover door attached to said housing.

17. The method of claim 16 wherein said hinged fuel cover door comprises ventilation holes.

18. The method of claim 17 wherein said raised perimeter comprises ventilation holes.

19. The method of claim 14 wherein some of said ventilation holes are positioned adjacent to said burner.

20. The method of claim 14 wherein said raised perimeter comprises ventilation holes.

* * * * *